(12) United States Patent
Walter et al.

(10) Patent No.: US 6,279,756 B1
(45) Date of Patent: Aug. 28, 2001

(54) TELECOMMUNICATIONS EQUIPMENT RACK HAVING IMPROVED STRUCTURAL STRENGTH

(75) Inventors: Jonathan Trent Walter, Wake Forest; Bryan Chesley Caudill, Raleigh; Gilbert Walden Reece, Wake Forest, all of NC (US)

(73) Assignee: Newton Instrument Company, Inc., Butner, NC (US)

( * ) Notice: Subject to any disclaimer, the term of this patent is extended or adjusted under 35 U.S.C. 154(b) by 0 days.

(21) Appl. No.: 09/655,276

(22) Filed: Sep. 5, 2000

(51) Int. Cl.[7] .................................................. A47F 5/00
(52) U.S. Cl. ..................... 211/26; 211/189; 312/265.4; 361/829
(58) Field of Search ................... 211/26, 189; 312/265.1, 312/265.2, 265.3, 265.4, 265.6, 265.5; 361/724, 829

(56) References Cited

U.S. PATENT DOCUMENTS

| | | |
|---|---|---|
| 1,957,362 | * 5/1934 | Smith . |
| 4,715,502 | 12/1987 | Salmon . |
| 4,860,168 | 8/1989 | Wiljanen et al. . |
| 5,004,107 | 4/1991 | Sevier et al. . |
| 5,284,254 | 2/1994 | Rinderer . |
| 5,323,916 | 6/1994 | Salmon . |
| 5,645,174 | 7/1997 | Reiger et al. . |
| 5,682,301 | 10/1997 | Kraft . |
| 5,683,001 | * 11/1997 | Masuda et al. .......................... 211/26 |
| 5,819,956 | * 10/1998 | Rinderer ................................. 211/26 |
| 5,975,315 | * 11/1999 | Jordan .................................... 211/26 |
| 5,983,590 | * 11/1999 | Serban ................................ 211/26 X |
| 6,006,925 | * 12/1999 | Sevier .................................... 211/26 |
| 6,179,133 | * 1/2001 | Reece ..................................... 211/26 |

OTHER PUBLICATIONS

U.S. application No. 09/587,178 Walter, et al., filed Aug. 20, 1998.

* cited by examiner

Primary Examiner—Robert W. Gibson, Jr.
(74) Attorney, Agent, or Firm—Jenkins & Wilson, P.A.

(57) ABSTRACT

A rack assembly for mounting telecommunications equipment is provided which includes a pair of novel reinforcement gussets welded at the upright-to-base junctures at the bottom of the equipment rack in order to provide improved structural integrity and simplified manufacturing requirements to the telecommunications equipment rack.

8 Claims, 6 Drawing Sheets

TELECOMMUNICATIONS EQUIPMENT RACK HAVING IMPROVED STRUCTURAL STRENGTH

TECHNICAL FIELD

The present invention relates to racks or bays used primarily for mounting and housing telecommunications equipment, and more specifically to an improved rack for mounting and housing telecommunications equipment which provides enhanced structural strength through the use of novel reinforcement gusset members. The telecommunications equipment rack of the present invention is particularly intended for use to protect equipment from forces encountered during a seismic event.

BACKGROUND ART

Telecommunications equipment racks or bays are typically installed in controlled environments, vaults, central switching offices, and remote switch buildings. As known to those in the telecommunications field, telecommunications equipment racks or bays can be ordered in many different sizes and configurations. To provide strength and stability, telecommunications equipment racks are typically bolted to the floor and tied-off to the ceiling superstructure, and cables and wires may be run from the superstructure directly through the tops of the racks. The telecommunications equipment racks today can be expected to support fiber optic transmission cable and small scale, fully electronic components in addition to conventional bulky and heavy equipment such as copper wiring and electro-mechanical switching components that have been accommodated in the past by telecommunications equipment racks.

Regardless of the use of the telecommunications equipment rack, there is always a need for a rack with improved structural rigidity and greater ease of manufacture than is found in conventional telecommunications equipment racks and bays known at the present time. This is particularly desirable in localities where the telecommunications racks or bays must adhere to rigid industry standards regarding the ability of the telecommunications racks to withstand seismic forces. For example, racks intended to withstand seismic forces must be designed to comply with BELLCORE Zone 4 seismic tests set forth in document number GR-63-CORE.

Accordingly, the telecommunications equipment rack or bay of the present invention meets a long-felt need for a stronger telecommunications rack which is easier to manufacture than conventional racks. The novel structural reinforcement elements of the telecommunications rack or bay of the present invention can be used in a number of different types of racks, and the high strength telecommunications rack or bay of the present invention is particularly well adapted for use in seismic force resistant racks. The improved strength telecommunications equipment rack or bay of the present invention is described in detail hereinbelow so that the long-felt need for such an improved strength rack will be fully apparent.

DISCLOSURE OF THE INVENTION

In accordance with the present invention, applicant provides a new rack assembly for mounting telecommunications equipment that is designed so as to provide enhanced strength and ease of manufacture, and which lends itself particularly well to incorporation into the structure of seismic force resistant racks. The rack assembly comprises a pair of upstanding spaced-apart frame members wherein each of the frame members has an upper and a lower end. A horizontal frame member extends between the upper ends of the pair of upstanding spaced-apart frame members, and a base extends between the lower ends of the pair of upstanding spaced-apart frame members. The improved rack assembly of the present invention comprises a reinforcement gusset that is welded to the internal juncture of the lower end of each of the pair of upstanding spaced-apart frame members and the base so as to provide a welded reinforcement gusset at each opposing side of the base of the rack assembly.

The reinforcement gusset that is welded to the rack assembly comprises an upwardly inclined member having an upper end and a lower end and that defines an inverted U-shaped cross section that will abut one of the upstanding frame members at the upper end thereof and that will abut the base at the lower end thereof. The reinforcement gusset further comprises a triangular wing member extending outwardly and downwardly from the bottom of each side of the channels so that one side of each wing member abuts the base and another side of each wing member abuts the upstanding frame member of the rack assembly. The use of the pair of reinforcement gussets to reinforce the rack assembly provides enhanced structural strength as well as ease of attachment during the manufacture of the rack assembly so as to negate the additional step used in the manufacture of conventional rack assemblies wherein two L-shaped anchor brackets are bolted into place subsequent to manufacture of the rack assembly.

Thus, it is an object of the present invention to provide an improved telecommunications equipment rack assembly that possesses enhanced structural strength.

It is another object of the present invention to provide an improved rack assembly that provides for improved structural integrity to the rack assembly as well as simplifying the manufacturing process of the rack assembly.

It is still another object of the present invention to provide an improved rack assembly that provides for increased strength at the upright-to-base junctions at the base thereof with smaller reinforcement elements that will still allow the rack to meet seismic force resistence standards of the industry.

It is still another object of the present invention to provide an improved rack assembly that incorporates improved reinforcement elements at the upright-to-base junctions at the bottom thereof and that can be used on a variety of different types of equipment racks, including seismic force resistant equipment racks.

Some of the objects of the invention having been stated hereinabove, other objects will become evident as the description proceeds when taken in connection with the accompanying drawings as best described hereinbelow.

BEST MODE FOR CARRYING OUT THE INVENTION

Figure 1:
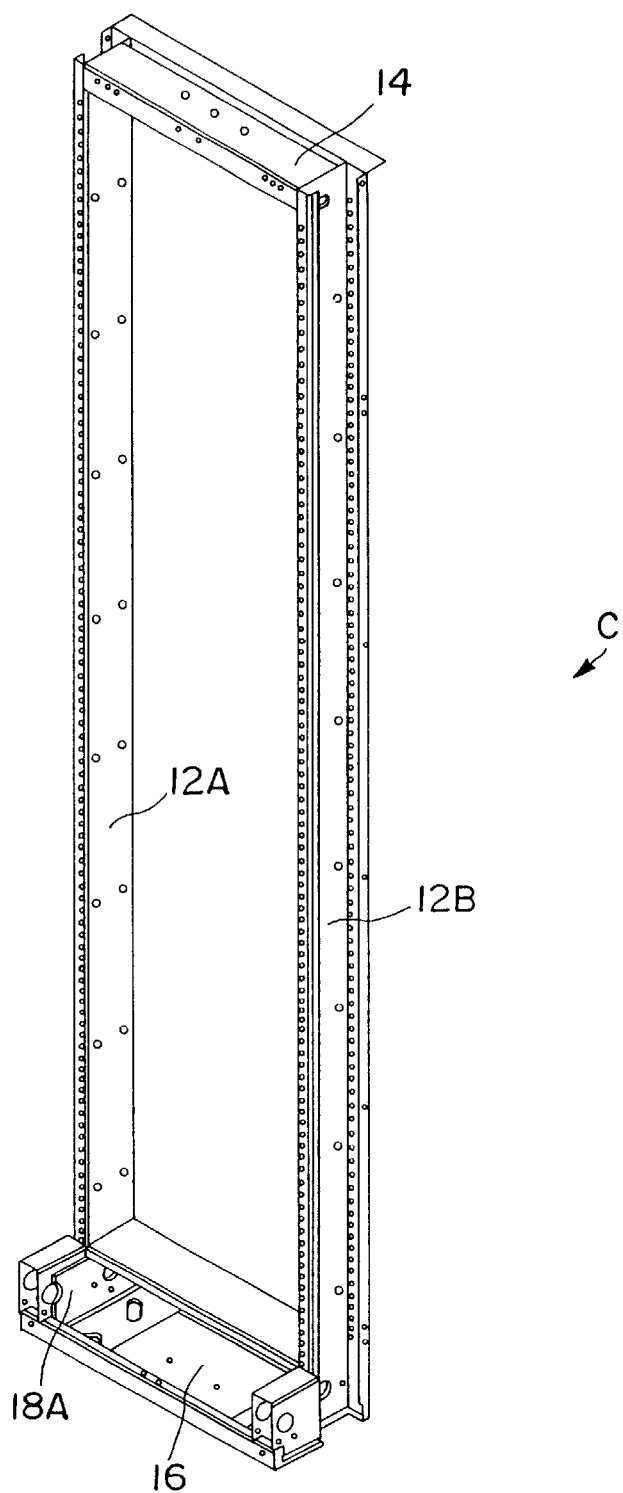
FIG. 1 is a front perspective view of a conventional (prior art) telecommunications equipment rack.
Figure 2:
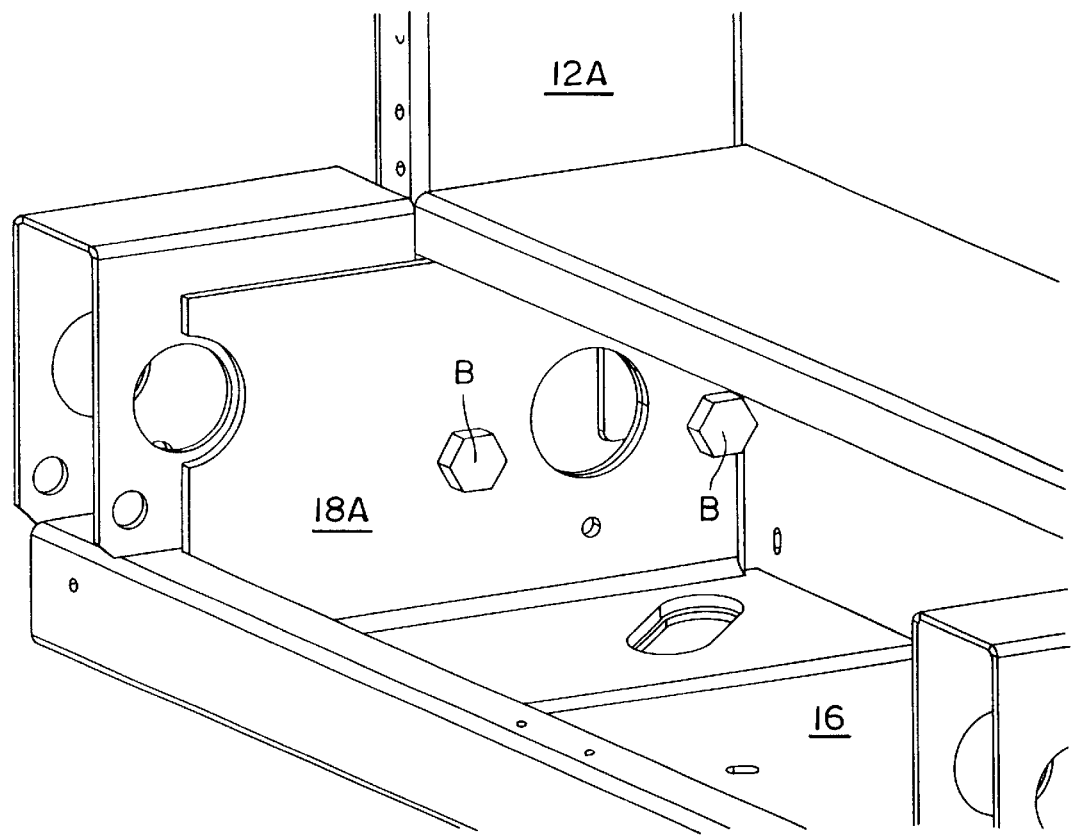
FIG. 2 is a front perspective view of the bottom portion of a conventional equipment rack shown in FIG. 1 and depicting one of the pair of L-shaped anchor brackets that are used at the base of the conventional equipment rack to strengthen the junctions between the upright frame members and the base.

Referring now to FIGS. 1–6A–6C of the drawings, the improved structural strength equipment rack of the present invention is shown and generally designated 10. Equipment rack 10 is constructed from two upright metal channels, 12A, 12B joined by horizontal metal channel crossbar 14 at the top and a base or base weldment 16 at the bottom thereof to which a network bay base over or UFER base cover may be attached by suitable means such as screws (not shown). In conventional equipment rack C shown in FIGS. 1–2, the juncture of each upright metal channels 12A, 12B to base or base weldment 16 at the bottom of equipment rack 10 is reinforced by bolting a respective L-shaped anchor bracket 18A, 18B at the juncture of the corresponding upright metal channel, 12A, 12B, respectively, with base 16 with bolts B in a manner that is well known to one skilled in the telecommunications rack art.

Conventional L-shaped anchor brackets 18A, 18B are typically formed of a thicker steel (e.g., 3/16 inch thick) than the remainder of equipment rack 10 (e.g., 1/8 inch thick steel) and are normally bolted into place subsequent to manufacture of equipment rack 10. Although the use of L-shaped anchor brackets 18A, 18B to strengthen equipment rack 10 has sufficed in the past, this particular use of reinforcement elements 18A, 18B possesses many shortcomings as described herein including: requiring a different raw material in view of being thicker than the remaining steel in the equipment rack;

requiring an additional bolting step to secure the brackets in place subsequent to manufacture of the equipment rack; and requiring time-intensive bolting (as opposed to welding) of the L-shaped anchor brackets to the equipment rack. In spite of the shortcomings, the conventional L-shaped anchor brackets 18A, 18B provided the necessary strength to enhance the structural integrity of equipment racks to which they were secured and to allow certain standard design equipment racks to pass rigorous industry seismic test requirements.

Referring now to FIGS. 3–6A–6C of the drawings, the reinforcement gussets 20A, 20B which are welded at the juncture of upstanding frame members 12A, 12B, respectively, with base or base weldment 16 in accordance with the present invention will overcome well known shortcomings of conventional L-shaped anchor brackets 18A, 18B described hereinbefore. As can be seen with reference to the drawings, each reinforcement gusset 20A, 20B is formed from an inclined inverted U-shaped cross section channel member 20A' which is formed so that the upper end will abut a corresponding one of upright channels 12A, 12B and the lower end will abut base 16 in a flush manner. Reinforcement gussets 20A, 20B further include a triangular wing 20A" that extends outwardly and downwardly from the bottom edge of each side of channel member 20A' so that one side of each wing 20" abuts base 16 of equipment rack 10 and the other side of each wing 20A abuts a corresponding one of upright channels 12A, 12B. As can be appreciated with particular reference to FIGS. 6A–6C, reinforcement gussets 20A, 20B each comprise 5 walls defined by 4 bends in the metal in order to increase the strength of the upright-to-base junction in a smaller size gusset than conventional L-shaped anchor brackets 18A, 18B while still providing significant enhanced strength to equipment rack 10 and allowing selected models of equipment rack 10 to meet seismic force resistant standards required by the industry. Further, reinforcement gussets 20A, 20B each include a pair of spaced-apart flanges 20A''', 20B''' (see FIGS. 6A–6C) that extend forwardly from the upper end of channels 20A', 20B'. Flanges or tabs 20A''', 20B''' are intended to be inserted into a pair of corresponding slots S formed in the bottom of each corresponding upright channel 12A, 12B so as to receive spaced-apart flanges 20A''', 20B''' of reinforcement gussets 20A''', 20B''' therein prior to welding of the reinforcement gussets into place.

Summarily, reinforcement gussets 20A, 20B that are welded to equipment rack 10 to form the improved rack 10 of the present invention are preferably formed of sheet steel of 1/8 inch thickness so as to be formed of the same material as the remainder of rack 10 and ease the need for an inventory of different raw materials to manufacture equipment racks 10. Further, reinforcement gussets 20A, 20B are welded into place during the manufacturing process that forms equipment rack 10 and this negates the additional step of bolting L-shaped reinforcement brackets 18A, 18B of the prior art into place on an equipment rack subsequent to manufacture so as to simplify the manufacturing process for the improved equipment rack. Also, whereas conventional L-shaped anchor brackets 18A, 18B are merely formed of two legs defining a 90° bend, reinforcement gussets 20A, 20B define a much more complex shape that utilizes 4 bends in the metal to form 5 walls so as to increase the strength of the upright channel-to-base junction in a smaller size gusset than conventional illustrated brackets 18A, 18B while still allowing the improved equipment rack to meet all necessary industry standards, including seismic force resistance standards well known in the industry.

Figure 3:
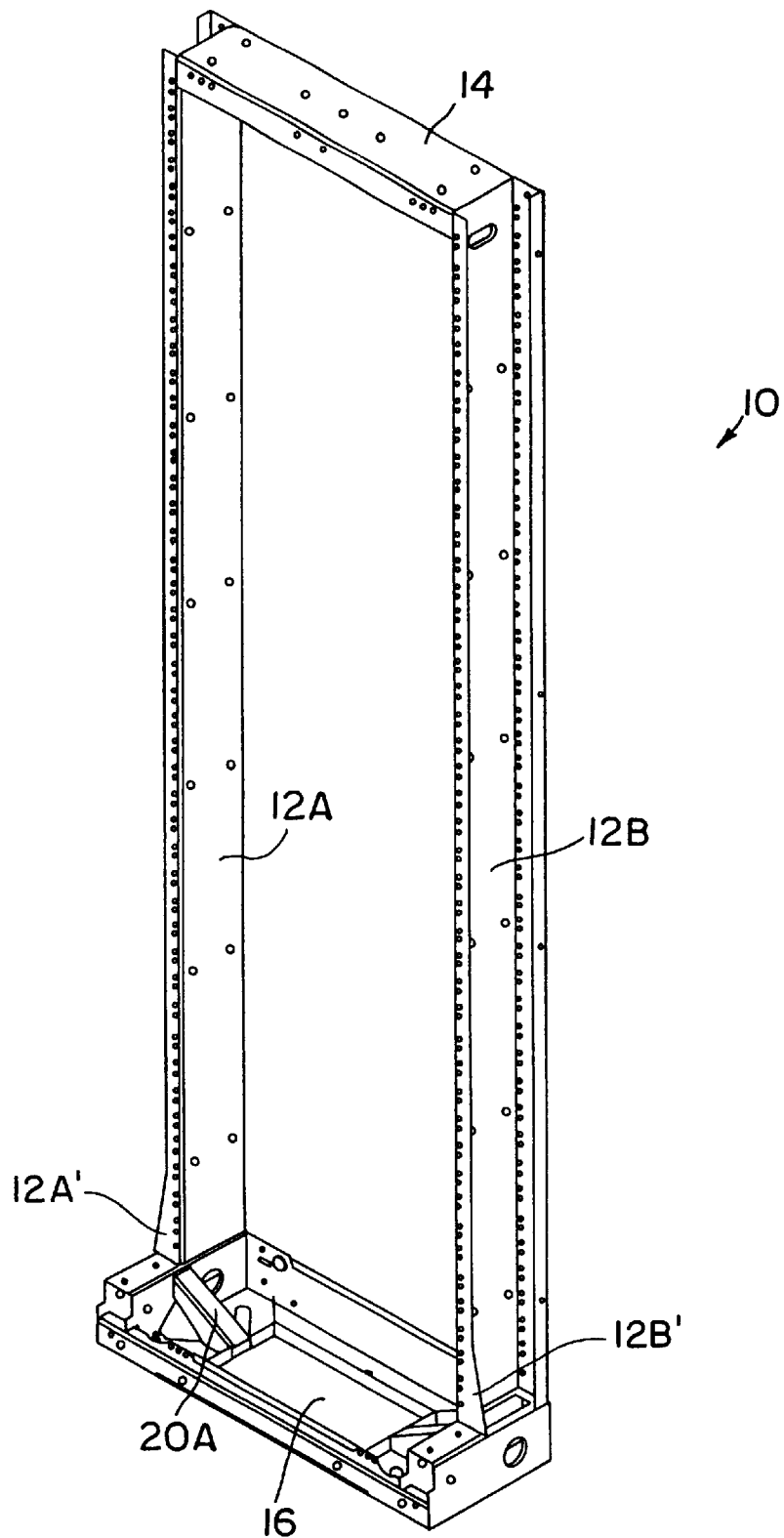
FIG. 3 is a front perspective view of the improved equipment rack of the present invention.
Figure 4:
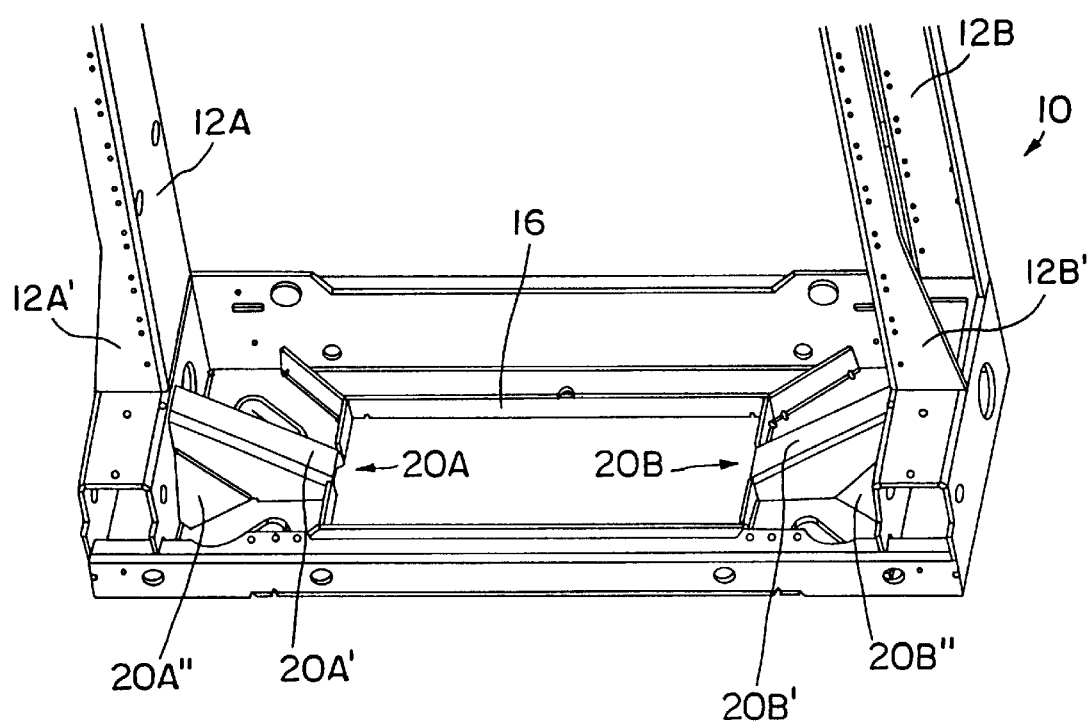
FIG. 4 is a perspective view of the bottom portion of the improved equipment rack of the present invention shown in FIG. 3 showing the location of the welded reinforcement gussets at the bottom of the equipment rack that are used to reinforce the junctions between an upright frame members and the base.
Figure 5:
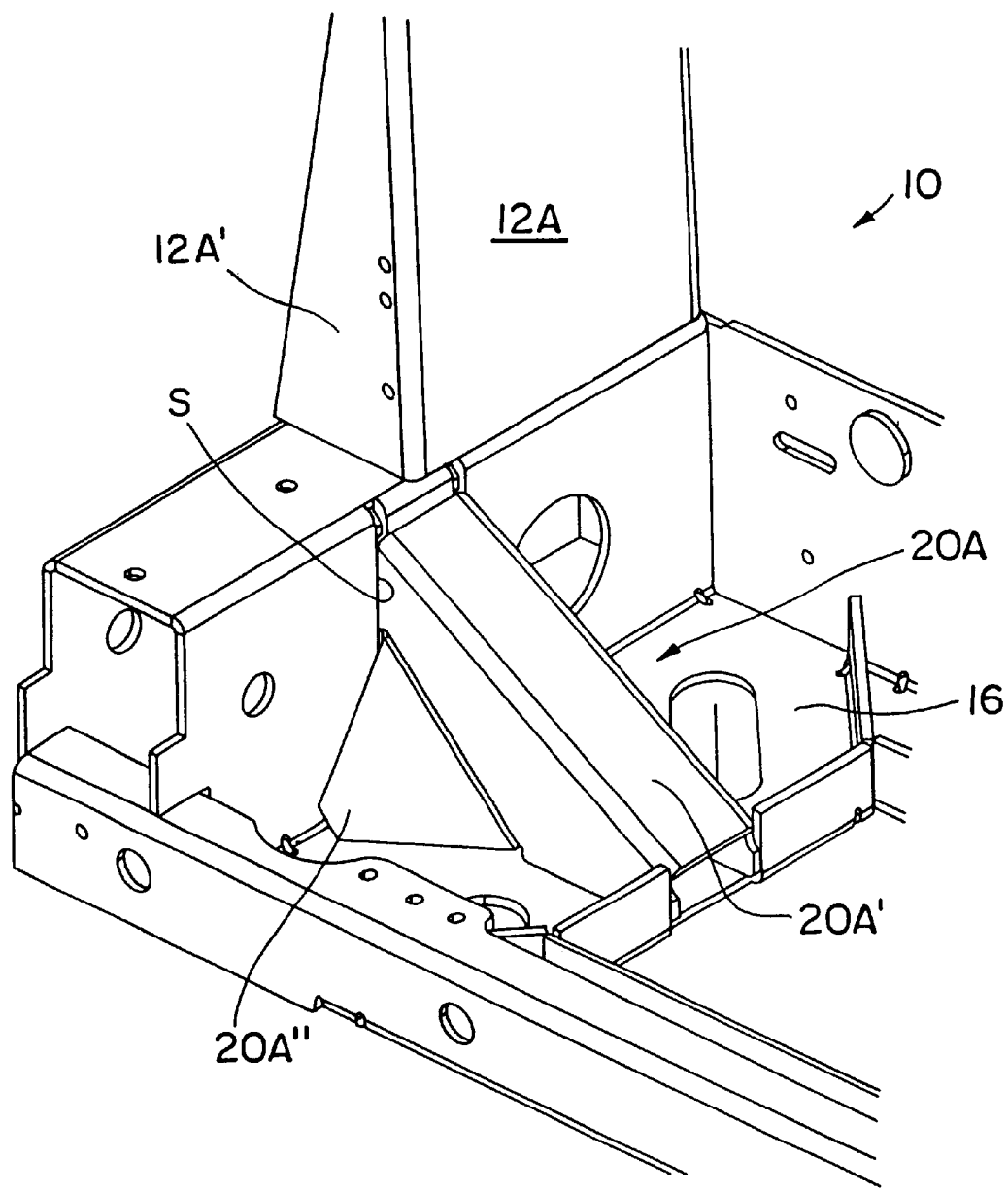
FIG. 5 is a front perspective view similar to FIG. 2 of the improved equipment rack of the present invention and showing the welded reinforcement gusset at the juncture of an upright frame member and the base used in lieu of the L-shaped anchor bracket bolted thereto as shown in FIG. 2.
Figure 6A:
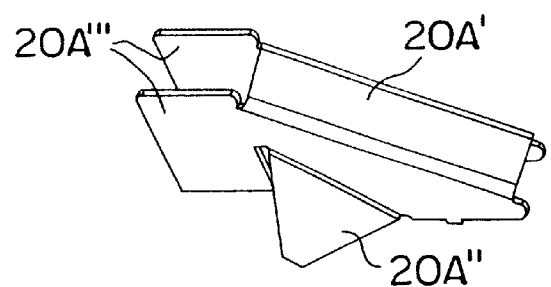
FIGS. 6A, 6B, and 6C show top perspective view, top plan view, and side elevation view, respectively, of the reinforcement gusset used in the improved equipment rack of the present invention.
Figure 6B:
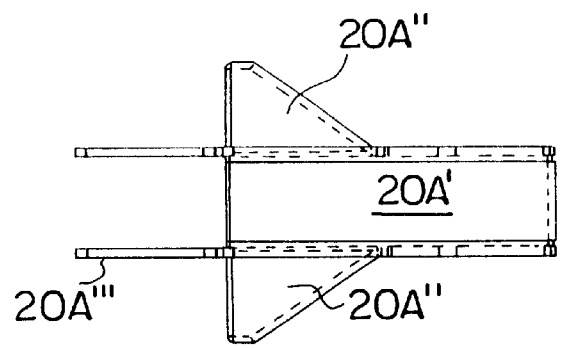
Figure 6C:
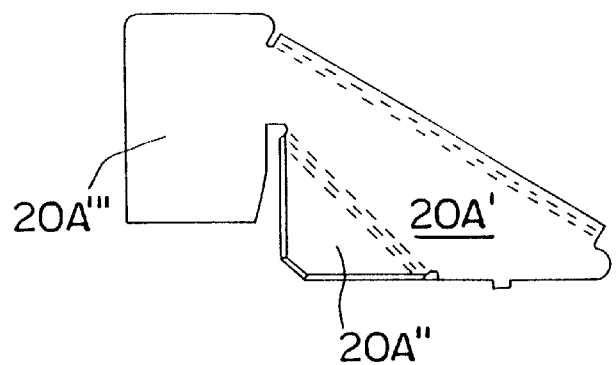

Also, equipment rack 10 includes upstanding frame members 12A, 12B wherein the front flange of each of the U-shaped channels is flared outwardly at the lower end at 12A',12B' to reduce stress at the juncture with base 16 (see FIGS. 3–5).

In accordance with the present invention, it is believed that gussets 20A, 20B can be welded to the upright-to-base junctions of equipment racks in a variety of seismic force resistant as well as non-seismic force resistant racks including the following types of racks.

1. Unequal Flange Equipment Racks
2. Network Bay Racks

It will be understood that various details of the invention may be changed without departing from the scope of the invention. Furthermore, the foregoing description is for the purpose of illustration only, and not for the purpose of limitation--the invention being defined by the claims.

What is claimed is:

1. In a rack assembly for mounting telecommunications equipment of the type comprising a pair of upstanding spaced-apart frame members wherein each of said frame members defines an upper and a lower end; a horizontal frame member extending between the upper ends of said pair of upstanding spaced-apart frame members; and a base extending between the lower ends of said pair of upstanding spaced-apart frame members; the improvement wherein a reinforcement gusset is welded to the internal juncture of the lower end of each of said pair of upstanding spaced-apart frame members and the base so as to provide a welded reinforcement gusset at each opposing side of the base of the rack assembly, and wherein each reinforcement gusset comprises:

an upwardly inclined channel member having an upper end and a lower end and defining an inverted u-shape cross section adapted to abut one of the upstanding frame members at the upper end thereof and to abut the base at the lower end thereof, and including a triangular wing member extending outwardly and downwardly from the bottom of each side of the channel so that one side of each wing member abuts the base and another side of each wing member abuts the upstanding frame member;

wherein the rack assembly possesses enhanced structural strength due to enhanced reinforcement at the juncture of each of the pair of upstanding frame members with the base of the rack assembly.

2. The rack assembly according to claim 1 wherein the reinforcement gusset is formed of steel with four bends and five walls.

3. The rack assembly according to claim 2 wherein the reinforcement gusset is formed of ⅛ inch thick steel.

4. The rack assembly according to claim 1 wherein the reinforcement gusset includes a flange on each side of the upper end thereof adapted to be inserted into a corresponding pair of slots at the bottom of a corresponding upstanding frame member prior to welding of the gusset to the rack assembly.

5. In a rack assembly for mounting telecommunications equipment of the type comprising a pair of upstanding spaced-apart frame members wherein each of said frame members defines an upper and a lower end; a horizontal frame member extending between the upper ends of said pair of upstanding spaced-apart frame members; and a base extending between the lower ends of said pair of upstanding spaced-apart frame members; the improvement wherein a reinforcement gusset comprising an inclined channel having an upper end and a lower end is welded to the internal juncture of the lower end of each of said pair of upstanding spaced apart frame members and the base with the upper end of each of said inclined channel or tubes welded to one of said pair of upstanding spaced-apart frame members and the lower end welded to a corresponding one of the opposing sides of the base so as to provide a welded web therebetween at each opposing side of the base of the rack assembly; wherein the rack assembly possesses greater structural strength than a rack assembly wherein conventional L-shaped anchor brackets are bolted to each of the upstanding frame members and the base.

6. The rack assembly according to claim 5 wherein the reinforcement gusset is formed of ⅛ inch thick steel.

7. The rack assembly according to claim 5 wherein the reinforcement gusset comprises two opposing sides and includes a flange on each opposing side of the upper end thereof adapted to be inserted into a corresponding pair of slots at the bottom and of a corresponding upstanding frame member prior to welding of the gusset to the rack assembly.

8. The rack assembly according to claim 5 wherein each of said pair of spaced-apart frame members comprises a U-shaped cross section defining a front flange and a rear flange, and wherein each of said front flanges is flared outwardly at the lower end thereof adjacent the base.

* * * * *